United States Patent
Lucas

[11] 3,808,795
[45] May 7, 1974

[54] POLLUTION-FREE GAS TURBINE SYSTEM

[75] Inventor: Roy N. Lucas, Houston, Tex.

[73] Assignee: Petrolite Corporation, St. Louis, Mo.

[22] Filed: Dec. 7, 1972

[21] Appl. No.: 313,015

[52] U.S. Cl.................. 60/39.5, 60/39.05, 60/317, 60/39.53, 204/302
[51] Int. Cl. ............................................. F02c 7/30
[58] Field of Search ........ 204/302; 60/39.02, 39.03, 60/39.05, 39.06, 39.59, 39.53, 285, 286, 297, 317, 318, 39.46, 39.5

[56] References Cited
UNITED STATES PATENTS

| | | | |
|---|---|---|---|
| 2,855,359 | 10/1958 | Woelflin | 204/302 |
| 2,735,265 | 2/1956 | Du Bois Eastman | 60/39.05 |
| 2,972,861 | 2/1961 | Davies | 60/39.02 |
| 2,718,755 | 9/1955 | Heller | 60/39.02 |
| 3,167,913 | 2/1965 | Muhlberg et al. | 60/39.53 |
| 3,369,361 | 2/1968 | Craig | 60/39.59 |

Primary Examiner—Carlton R. Croyle
Assistant Examiner—Warren Olsen
Attorney, Agent, or Firm—Emil J. Bednar

[57] ABSTRACT

This specification discloses:

A pollution-free system for operating a gas turbine from a liquid untreated oil containing an alkali metal salt. Fresh water is dispersed within the untreated oil and passed into a vessel containing an electric field for forming a treated oil phase and a salt-laden effluent water phase. The treated oil is a high quality combustible fuel which is intermixed with compressed air, and subjected to combustion for operating the gas turbine with the resultant discharge of high-temperature combustion product gases which are released through an exhaust vent to the atmosphere at temperatures of about 1,000° F. The effluent water is passed through an injector means for dispersion into the exhaust vent so that the combustion product gases vaporize the effluent water forming a total gas solution without visible components and at temperatures where sodium ion materials are relatively non-corrosive to the ferrous metal conduits forming the exhaust vent.

9 Claims, 1 Drawing Figure

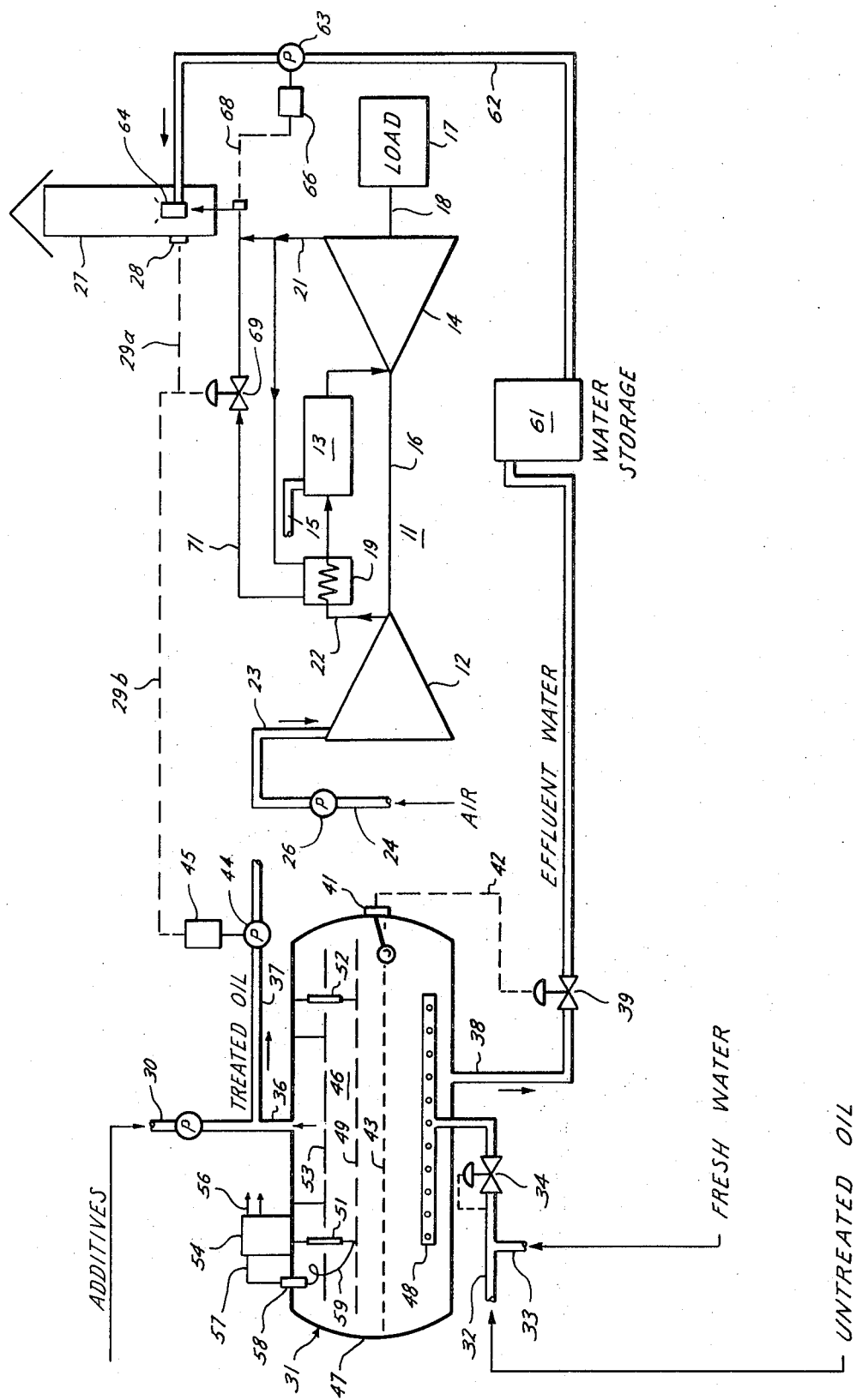

POLLUTION-FREE GAS TURBINE SYSTEM

BACKGROUND OF THE INVENTION

1. Field of the Invention

The present invention relates to a system for operating a gas turbine from an untreated oil containing and alkali metal salt and, more particularly, it relates to the pollution-free disposal of salt-laden effluent water which was derived from purification of the untreated oil into a combustible fuel.

2. Description of the Prior Art

Gas turbines have a wide application and utility in providing sources of power at relatively high efficiencies from greatly reduced machinery compared to steam and internal combustion prime movers. Gas turbines are small in size and weight, do not require cooling water, are able to run unattended, and may be fully controlled by automation devices and remote control systems. Other noteworthy advantages of the gas turbine reside in rapid start-up and shut-down features of operation, operate with minimum air pollution ($NO_2$, $SO_3$, particles, etc.) than other prime movers, reduced maintenance and stand-by costs, and extended operational life in either continuous or intermittent service.

The most common gas turbine is that employed for propelling jet aircraft. This application of the gas turbine is well known to the general public. However, there are many other additional applications of the gas turbine in non-aviation applications. The placement of gas turbines in stationary installations has greatly increased in the last two decades. These installations range in size from 50 to nearly 50,000 horsepower in gas turbines. Electrical generating usage employs about half the large industrial installations of gas turbines. These gas turbines are employed mainly in electrical power generation for peak-load duty to which they are well suited by integration into automation and remote control systems. This usage of gas turbines is especially advantageous where additional electrical power capacity may be needed more quickly than can be provided by the conventional stationary steam generating power plant. Other uses of the gas turbine include installations as the prime mover for compressors which are employed for moving gas through a pipe line. Other installations include gas turbine driven railroad locomotives, naval and maritime vessels, prime movers in the petroleum and steel industries.

The fuel for the gas turbine in non-aviation installations was originally natural gas, and other gaseous type fluids can be used which are clean burning and non-corrosive. However, gaseous fluids (natural gas, etc.) are not always available to commercial users. Since 1952, major advances have been accomplished in the use of liquid fuels for gas turbine. One of the first installations of this type was a crude oil fired turbine in an oil pipe line pumping installation. Other types of liquid fuels have been used in gas turbines, which fuels include distillates, crude oil, and products of crude oil refining such as residium and residual oils. One installation of the gas turbine has been operated with creosote pitch as the fuel. Whatever liquid is employed, certain specifications must be observed otherwise the gas turbine is quickly injured by corrosion and deposition effects. In hydrocarbon types of liquid fuels, such as crude oil, distillates, and residual crude oil products, the limiting item of the specifications is generally the sodium and vanadium ion contents. These two materials can be tolerated only in amounts up to a few parts per million before there is the danger of corrosion, fouling and deposition at elevated temperatures. These materials, during combustion, produce sodium sulfate, sodium vandanates, and vanadium pentoxide which are semimolten and corrosive at temperatures as low as 1150°F. The corrosive attack by these materials becomes virtually catastrophic at the higher temperatures normally associated with efficient gas turbine operation. Operation of the gas turbine at lower firing temperatures results in substantially impaired power output and reduced operating efficiency.

Additives have been found which may be added to liquid fuels for inhibiting vanadium attack upon the metal surfaces of the gas turbine at elevated temperatures. Usually, magnesium ion (magnesium sulfate) is added in small amounts to the liquid fuel to inhibit the undesired effects of vanadium materials within the gas turbine. However, no additive or inhibitor has been found which can prevent the disastrous problems occurring from burning sodium-containing liquid fuels at normal industrial gas turbine temperature levels, which temperatures are approximately between 1,400° and 1,600° F.

The hydrocarbon liquid fuels which contain sodium ions may be treated by a process which resembles the desalting of crude oil in refineries. The sodium ion material may be present in the liquid fuel as sodium naphthates, salt water, sodium chloride crystals or other alkali metal salts. These sodium ion materials may be removed by adding fresh water to the oil phase followed by an intimate mixing step to form a water-in-oil emulsion. The emulsion is then resolved by settling, centrifuging or electrical field deslating, to reduce the sodium content to acceptable levels. However, once the treated liquid fuel is obtained, it must be protected from subsequent sodium ion contamination during transportation or while it is in storage for use as fuel for the gas turbine. All storage tanks must be maintained clean and free of any sodium ion substances so that the treated oil remains uncontaminated.

Oil refineries since 1937 have employed Petreco electric desalters for reducing the salt content of crude oils to levels of a few parts per million. These electric desalters receive an emulsion formed by finely dispersing fresh water into the crude oil. The emulsion, with an electrical field, is resolved into a desalted crude oil phase and an effluent water carrying extracted salt-bearing materials. The electric desalting operation may employ one or more electrical treaters, or a single vessel containing two electric field desalting stages, in a completely integrated installation within the oil refinery processing train.

A desalted crude oil or residium may be provided by processing in a refinery and will serve as an adequate pure liquid fuel for the gas turbine. However, any subsequent recontamination by sodium ion materials detract from such liquid fuels for gas turbines in field installations. Consider the installation of a gas turbine as a prime mover upon a crude oil pipe line. A separate storage tank would be required for the refinery desalted hydrocarbon to be employed as liquid fuel for the gas turbine.

In other installations, such as the preparation of a treated liquid fuel for locomotives, the smaller amount of fuel consumed would not justify a refinery-type complex installation of electrical desalters. Alternatively, the amount of liquid fuel consumed by the gas turbine in such installations would require excessively large storage facilities for the desalted liquid fuel.

Small-sized electric treaters for resolving emulsions have been available for a number of years in the marketplace, and are known as Chemelectric dehydrators. Reference may be taken to U.S. Pat. No. 3,207,686 for an example of this type of dehydrator. The field installation of the dehydrator includes sufficient automated devices that the dehydrator can be made to operate unattended, in start-up, normal treating operation, and shut-down, and at remote installations without operator attention. This type of dehydrator has made it possible to provide LACT facilities in automated systems for producing crude oil to pipe line specifications. For this purpose, the crude oil emulsion is dehydrated by application of an electric field to a residual water content of 3 percent by volume or less. The operation of the dehydrator may be used for desalting the crude oil by adding between 5 and 15 percent by volume of fresh water to the incoming crude oil. In many cases, the desalted (treated) oil will have a residual water content of 0.5 percent by volume. The salt content of the crude oil can be reduced in a single dehydrator from tens of pounds per thousand barrels of oil to less than one pound per thousand barrels of oil. Thus, electric field desalting can provide an acceptable treated oil as the liquid fuel for a gas turbine in an integrated field installation.

It will be appreciated that the water removed from the electric dehydrator has a high salt content which magnitude depends upon the salt content of the crude oil. For example, the reduction in salt content of crude oil from 5 to 1 pound per thousand barrels of crude oil using 5 percent by volume fresh water will result in effluent water from the dehydrator having a salt content of about 100 pounds per thousand barrels. This salt water cannot be discharged into public water courses. This salt-laden water can be treated, at relatively high costs, to reduce the salt content sufficiently that the residual water can be discharged into public water courses. The treatment costs for such purposes severely detract from the great utility of field preparation of liquid fuel for gas turbines.

The present invention is directed to a pollution-free system for operating a gas turbine from liquid untreated oil containing an alkali metal salt. An especial feature is the cost-free disposal of the salt-laden water from the electric dehydrator without subsequent pollution problems to detract from the advantages of the gas turbine in having (1) any visible exhaust gases, (2) any amounts of cooling water, (3) created thermal pollution problems, and (4) undue corrosion problems in metal conduits carrying the exhaust gases. Further, the present invention does not require any significant alteration of equipment or increased operating costs relative to the gas turbine installation.

SUMMARY OF THE INVENTION

In accordance with this invention, there is provided a pollution-free system for operating a gas turbine from a liquid untreated oil containing an alkali metal salt. The system includes a vessel having an emulsion inlet means, oil phase outlet means and water phase outlet means. The vessel contains electrodes energizable from an external power source to create an electric field for resolving a water-in-oil emulsion into a treated oil phase and an effluent water phase laden with salt. A supply means provides streams of the untreated oil and fresh water to a mixing means to produce the emulsion applied to the vessel. The emulsion has the oil as the external phase and the dispersed fresh water as an internal phase. A gas turbine receives the treated oil phase as a combustible fuel, which fuel is intermixed with compressed air and subjected to combustion for operating the gas turbine with the resultant production of high-temperature combustion product gases released through an exhaust vent to the atmosphere at temperatures between about 300° and about 1,200° F. Injector means introduce the salt-laden effluent water phase into the exhaust vent wherein the combustion product gases vaporize the effluent water stream and form a total gas solution without visible components at temperatures where the sodium ion materials are relatively non-corrosive to ferrous metal conduits forming the exhaust vent.

DESCRIPTION OF THE DRAWING

The drawing is a schematic flow diagram of a combination of electric desalter and gas turbine arranged in accordance with the present invention.

DESCRIPTION OF SPECIFIC EMBODIMENTS

In the drawing, there is shown an arrangement of apparatus illustrating the system of the present invention. The system comprises a gas turbine 11 having a compressor stage 12, a combustion stage 13, and a turbine stage 14. The rotary components of the compresssor stage 12 and turbine stage 14 are connected together by a drive shaft 16 and the output of the turbine stage is applied to a load 17 by an output shaft 18. The load 17 may comprise electrical generators, pumps, or other types of mechanical and electical loads. Usually, the load 17 is an electrical generator. The gas turbine 11 usually is an open type gas turbine wherein air and combustion products are passed only once through the power plant. This type offers the advantage of simple controls and fluid sealing arrangements. It can also be designed for high output power-to-weight ratios, for operation with a minimum of controls and without cooling water requirements. Most of the gas turbine plants in field installation operation are of the open type. If desired, a heat exchanger 19 may be included for raising the temperature of the compressed air passing to the combustion stage 13. The heat exchanger 19 provides for transferring heat from the turbine stage's exhaust 21 to the incoming compressed air at the outlet 22 of the compressor stage 12 upstream of combustion stage 13. In many cases, the heat exchanger 19 is not required. If the heat exchanger 19 is used, it must withstand relatively large temperature changes as the gas turbine 11 is placed into operation and removed from service and present a relatively low pressure drop to the compressed gases passing from the outlet 22 to the combustion stage 13.

As will be apparent, the described arrangement for the gas turbine 11 is relatively conventional and many variations of this design can be used. The gas turbine 11 receives a liquid fuel through an inlet 15 to the combustion stage 13. The air is introduced through an air line 24 and passes through a suitable pump 26 to raise the fluid to the desired inlet pressure for the compressor stage 12. Usually, the incoming air in the inlet 23 is at pressures of 150 p.s.i. or greater. In most installations, the amount of air introduced through the air inlet 24 is maintained at a relatively constant magnitude and operation of the gas turbine 11 is adjusted by the amount of liquid fuel which passes into the inlet 15.

In the particular system of this invention, the liquid fuel is obtained through the use of the electric treater 31. The electric treater 31 is arranged to receive at inlet conduit 32 an untreated oil which is mixed with a small quantity of fresh water supplied through inlet conduit 33. The resultant liquid mixture is passed through a mixing valve 34 which provides a suitable pressure drop on the incoming fluids for intimately dispersing the fresh water throughout the untreated oil. The electric treater 31 separated by action of an electrical field the resultant oil-continuous emulsion into a treated oil phase which is removed through outlet conduit 36, and then passed through an interconnecting conduit 37 to the inlet 15 of the combustion stage 13 of the gas turbine 11. A high pressure feed pump can be placed into the conduit 37. The separated water phase from the electric treater 31 is removed as effluent water through an outlet 38 in which fluid flow is controlled by a motor control valve 39 activated from a float controller 41 by an interconnection illustrated by chain line 42. The float controller 41 senses the oil-water interface 43 within the electric treater 31 and regulates removal of the effluent water to maintain the interface at a relatively constant horizon.

The electric treater 31 is of a suitable construction which is capable of resolving electrically water-in-oil emulsions or dispersions. For example, the apparatus illustrated in U.S. Pat. No. 2,855,359 can be employed for this purpose. In many instances, only one electric treater 31 will be employed for providing the treated oil stream for the gas turbine 11. However, an arrangement of two or more series or parallel connected electric treaters may be employed, if so desired. The series and parallel flow connections of electric treaters is well known in the refinery arts and can be applied in like fashion to the present invention. The electric treater 31 employs an electrical field in which the water-in-oil emulsion is coalesced or resolved electrically into the separated treated oil and effluent water phases. The electric treater 31 has an electrical field 46 contained in a metallic vessel 47 which is adapted to withstand the operating pressures of the coalescing system. Generally, the pressure within the vessel 47 is maintained such that all components reside in the liquid phase within the electrical field.

The electric field 46 within the electric treater 31 may be provided by any suitable arrangement. For example, the electrical field can be defined by foraminous planar electrodes 49 and 53 which are spaced apart between about 3 and about 11 inches. The electrical potential applied to these electrodes creates an electric field with a gradient usually between about 500 and about 10,000 volts per inch. The magnitude of the gradient, or the applied potential, within the electric treater 31 which resolves the emulsion is not critical.

The electric treater 31 includes a distributor 48 for introducing the emulsion directly from the mixing valve 34 into the vessel 47. The emulsion flows upwardly through the interface 43 and enters into the electric field 46 formed by an energized 49 mounted in electrical isolation from the vessel 47 by insulators 51 and 52. The upper perimeter of the electric field 46 is defined by a grounded electrode 53. The energized electrode 49 receives a current from any suitable power source. The power source can be a transformer 54 which is energized from main power conductors 56 carrying a suitable source potential such as 440 A.C. The transformer 54 provides a current at high potential (relative to the vessel 47) through an output insulated conductor 57 which passes the current through an entrance bushing 58 mounted in the sidewall of the vessel 47. The current is then applied through a flexible lead 59 to the energized electrode 49. Other arrangements could be employed for energizing the electrode 49, if desired. Preferably, the electrodes 49 and 53 are horizontally disposed foraminous electrodes extending through substantially the entire horizontal extent of the vessel. This electrode structural arrangement insures for highly efficient resolution of the dispersions into a treated oil phase and the effluent water phase.

The untreated oil is supplied under pressure conditions to the inlet 32 and can be taken from any source. Usually, the untreated oil is heated to suitable elevated temperatures for facilitating the electrical resolution of the emulsion supplied through the distributor 48 into the vessel 47. Preferably, the temperature of the untreated oil and water mixture is at approximately 150° F. (or higher) before introduction into the electric treater 31. Elevated temperatures facilitate the removal of sodium ion materials and solids from the untreated oil through the action of the electric treater 31.

The untreated oil may be crude oil, or crude oil products such as distillates and residium. As the term "untreated oil" is used herein, it denotes an oil which has a sufficiently high content of alkali metal salt (such as sodium chloride or other sodium ion-containing material) to provide an undesirable combustion fuel, especially in gas turbines. The untreated oil is processed in the electric treater 31 for reducing the sodium ion content to relatively low levels, usually 5 ppm or less. The treated oil also has a residual water content of usually less than 0.5 percent in volume. In the present system, the untreated oil is processed to these specifications to produce a combustible fuel which is especially suited for use as the liquid fuel in the gas turbine 11. In many cases, the electric treater 31 produces a combustible liquid fuel having a sodium ion content of about 2 ppm and a residual water content of about 0.1 percent by volume. It will be apparent that the function of the electric treater 31 in resolving the emulsion formed of untreated oil and fresh water is performing a procedural step which is termed as "desalting." This refinery art terminology is used in the present system to denote a process which is commonly used for the removal of salt materials from crude oil. Desalting terminology is also intended in this description to apply equally to the processing of any untreated oil by mixing fresh water to form an oil phase continuous emulsion and the subsequent electric resolution of the emulsion into a treated oil phase and an effluent water phase carrying the removed sodium ion material and water wetted solids.

The effluent water withdrawn through the outlet 38 from the electric treater 31 has a substantial sodium ion (alkali metal salt) content and also varying amounts of solids. The magnitude of the sodium ion content depends upon the ratios of fresh water intermixed into the untreated oil which forms the emulsion entering the electric treater 31. The term "fresh water" as used herein is intended to include any water which has a sufficiently low content of sodium ions to be intimately mixed into the untreated oil to form the emulsion which is subjected to electrical resolution to produce a treated oil phase which has the desired reduced sodium ion content. Generally, the fresh water will be municipal water, or water from a river or other non-brackish water source.

The effluent water carries the removed sodium ion (alkali metal salt) material in magnitudes directly proportional to that removed from the treated oil. For example, fresh water is usually introduced in amounts between 5 and 15% by volume of the untreated oil stream. Thus, the salt content of the effluent water can be as high as twenty times the salt material contained in the untreated oil. For example, the untreated oil may have a sodium ion content of ten ppm of oil and is intermixed with 5 percent by volume of fresh water. If the electric treater reduces the sodium ion content to one ppm in the treated oil stream passing through the inlet 23 of the turbine stage 14, then the effluent water stream in outlet 38 will have a sodium ion content of 180 ppm. This sodium ion laden effluent water cannot be discharged directly into municipal water courses because it is essentially a highly concentrated brine. Severe pollution of the public water courses would result from such disposal. The present system provides a unique disposal of this salt-laden effluent water.

The treated oil in the conduit 37 is moved at a desired pressure and flow rate by a feed pump 44 into the inlet 15. The operation of the pump 44 is adjusted by a controller 45 to regulate the power applied to the load 17 by the gas turbine 11. Since the air supply at the inlet 24 is held at a constant magnitude, the quantity of treated oil passed by the pump 44 into the combustion stage 15 determines the power output of the gas turbine 11 applied to the load 17. In many cases, combustion product gases pass directly from the exhaust outlet 21 into an exhaust vent 27 for discharge into the atmosphere. These combustion product gases have a composition which allows them to be discharged directly into the atmosphere without creating a visible plume and any significant air pollution problems.

A function of the power output of the gas turbine 11 is the temperature of the combustion product gases passing from the exhaust outlet 21 of the turbine stage 14. The temperature of the combustion product gases in the exhaust vent 27 indicates directly the power output of the gas turbine 11 being applied to the load 17. Thus, the temperature of these gases can be sensed by a thermal detector 28 which provides an output signal indicated by chain lines 29a and 29b to the controller 45 for regulating operation of the pump 44. For example, an increasing loading of the turbine 11 causes the temperature of the gases in exhaust vent 27 to decrease. As a result, the detector 28 provides a signal to controller 45 to increase the rate of treated oil being moved in the conduit 37 to inlet 15 by the pump 44. Generally, the temperature of the combustion product gases being discharged to the exhaust vent 27 should be held to below 1,000° F. in order to protect the metallic portions of the turbine stage 14 against destruction by a residual salt material, and especially coating problems caused by molten vanadium oxide materials. If desired, an additive to prevent vanadium oxide glazing of the turbine stage 14 may be provided by introducing a magnesium ion inhibitor material. These additives flow through a conduit 30 containing pumping means for regulated introduction directly into the treated oil passing in conduit 37 to the combustion stage 13. The temperature of the combustion product gases in the exhaust vent 27 should be maintained by arrangement of the controller 45 so that the temperature never decreases below 300° F. which is the due point of sulfuric acid at substantially atmospheric pressure. Lesser temperatures in the combustion gases can cause severe corrosion to metallic materials.

In conventional operation of the gas turbine 11, the combustion product gases in the exhaust vent 27 usually have temperatures maintained between 800 and 1200° F. In addition, the constant mass of air introduced into the inlet 24 for a small amount of liquid fuel results in the combustion product gases having a mass of several hundredfold the mass of the effluent water produced by the electric treater 31. As a result, the heat content of the combustion product gases in the exhaust vent 27 is employed for disposal of the salt-laden effluent water. The effluent water is discharged as a fine spray into the hot stream of gases in the exhaust vent to be completely vaporized, dispersed and dissolved into the combustion product gases, thereby forming a total gas solution without visible components and at temperatures where the alkali metal salts are relatively non-corrosive to ferrous metal materials forming the exhaust vent 27. For this purpose, the effluent water is conducted from the control valve 39 into a storage tank 61. Then, the effluent water passes through a conduit 62 and is forced by a pump 63 into an injector 64 disposed within the exhaust conduit 27 directly into the stream of heated combustion product gases. In many cases the storage tank 61 may be unnecessary. However, it is preferred to have the storage tank 61 in the conduit 62 to insure that at no time does the effluent water reach the injector 64 in amounts greater than can be completely solutized by the combustion product gases.

The advantages of employing the storage tank 61 are several-fold. On one hand, the tank 61 provides for equalizing the concentration of the effluent water regarding the extracted alkali metal salt over a relatively longer period of flow than flowing directly from the electric treater 31 to the injector 64. In addition, the tank 61 can be employed for storing sufficient amounts of effluent water during periods of excessive rates of operation of the electric treater 31 beyond the capabilities of the injector 64 operation within the exhaust vent 27, or to provide a supply of effluent water which can be vaporized in the exhaust vent 27 whenever the electric treater 31 is not operating.

The pump 63 is regulated in operation by a controller 66 which receives a signal from a mass sensor 67 in the stream of combustion product gases between the outlet 21 of the turbine stage 14 and the inlet end of the exhaust vent 27. The control signal from the sensor 67 is applied to the controller 66 as indicated by the chain line 68. The controller 66 receives the signal 68 and responsively operates the pump 63 to move the effluent water through the injector 64 in only such quantities such that the mass ratio of combustion product gases to the effluent water provides sufficient latent heat to totally vaporize the effluent water stream and form the desired total gas solution. Generally, a mass ratio of the combustion product gases relative to the effluent water in the range of at least above 200:1 is usually sufficient in the present system. In addition, the mass flow sensor 67 through the signal 68 can operate the controller 66 and pump 63 so that the effluent water is never introduced into the exhaust vent 27 in amount greater than within the prescribed perimeters.

If the temperature of the combustion product gases in the exhaust vent 27 should rise above approximately 1,200° F., vaporization of the effluent water could produce a corrosive atmosphere with the alkali metal salt being hydrolized to hydrogen chloride and attacking the metal conduit forming the exhaust vent 27. For this purpose, the exhaust 21 of the turbine stage 14 can be passed through the heat exchanger 19 in regulated amounts so that the temperature of the combustion product gases in the exhaust vent 27 is always below 1,200° F. For this purpose, a motor control valve 69 is installed in the return conduit 71 between the heat exchanger 19 and the inlet of the exhaust vent 27. The control valve 69 can be operated by the signal 29a from the temperature sensor 28 attached to the exhaust 27. Thus, the temperature within the exhaust vent 27 is controlled by the temperature signal provided by the temperature sensor 28 through operation of the treated oil pump 44 or by the operation of the motor control valve 69 in the bypass line of the exhaust 21 through the heat exchanger 19.

The injector 64 may be of any construction, and preferably, it is a mechanical atomizer. The injector 64 can be a pressure atomizer where the effluent water is forced through tangential slots which impart a rotary motion thereto and then through orifices which guide the thin effluent water streams in an angular discharge as a fine spray into the upcoming combustion product gases introduced into the exhaust vent 27. If desired, the injector 64 could be a rotary cup atomizer or may employ auxiliary atomizing fluids such as steam or air.

Preferably, the mass sensor 67 is arranged so that the functioning of the controller 66 in moving the effluent water through the conduit 62 to the injector 64 is such that the combustion product gas always has a mass of about 600 times the mass of the effluent water passing through the injector 64. At these conditions, the temperature of the combustion product gases in the exhaust vent should be maintained between 800° and 1,200° F. for best results, and further, the temperature should be always maintained above 300° F. to prevent the condensation of sulfuric acid on the surfaces of the exhaust vent 27.

The mass of the high temperature combustion product gases in the exhaust vent 27 is such that all of the sodium ion material in the effluent water is completely dissolved within the gases. Any suspended solids are dispersed as microscopically-sized particles in the large volume of exhaust gases. It will be determined by a very simple calculation that the sodium ions and dispersed solids in the combustion product gases as determined by the preceding criterion is less than one part per billion. The solids are in the micron size range (or smaller) and not visible to the human eye. In addition, these finely dispersed particles are so widely dispersed within the vast masses of the combustion product gases that they produce no settling problems in adjacent land areas or accumulate in any concentration at any point on the surrounding land surface so as to create any pollution problem.

Thus, there has been provided a pollution-free process for operating a gas turbine from a liquid untreated oil containing an alkali metal salt. It will be envisioned that several other types of control functions associated with the gas turbine 11 may be employed for insuring the proper dispersion of the effluent water within the combustion product gases in the exhaust vent 27. As long as this dispersion is effected within the preceding defined perimeters, the operation of the present system will be pollution-free.

From the foregoing, it will be apparent that there has been provided a pollution-free system for operating a gas turbine from a liquid oil and simultaneously disposing of salt-laden effluent water from an electric treater employed for producing the treated oil. The present system operates in conformity with the best operational advantages of the gas turbine and is especially suited for automatic operation with very minimum of operator attention. It will be understood that certain features and alterations of the present system may be employed without departing from the spirit of this invention. This is contemplated by and is within the scope of the appened claims. Additionally, it is intended that the present description is to be taken as an illustration of the present system.

What is claimed is:

1. A pollution-free system for operating a gas turbine from a liquid untreated oil containing an alkali metal salt, said system comprising:
   a. vessel means having emulsion inlet means, oil phase outlet means and water phase outlet means, and said vessel means containing electrode means energizable from an external power source to create an electrical field for resolving a water-in-oil emulsion into a treated oil phase and an effluent water phase;
   b. supply means for providing streams of untreated oil and fresh water to a mixing means to produce the emulsion applied to said emulsion inlet means on said vessel means, and the emulsion having the oil as the external phase and the fresh water as the internal phase;
   c. a gas turbine receiving said treated oil phase as a combustible fuel which fuel is intermixed with compressed air, and subjected to combustion for operating said gas turbine with the resultant production of high-temperature combustion product gases released through an exhaust vent to the atmosphere at temperatures between about 300° and about 1,200° F.; and
   d. injector means for introducing said effluent water phase into said exhaust vent whereby the combustion product gases vaporize said effluent water stream and form a total gas solution without visible components at temperatures wherein sodium ion materials are relatively non-corrosive to ferrous metal conduits forming said exhaust vent.

2. A pollution-free system for operating a gas turbine from a liquid untreated oil containing an alkali metal salt, said system comprising:
   a. vessel means having emulsion inlet means, oil phase outlet means and water phase outlet means, and said vessel means containing electrode means energizable from an external power source to create an electrical field for resolving a water-in-oil emulsion into a treated oil phase and an effluent water phase;
   b. supply means for providing streams of untreated oil and fresh water to a mixing means to produce the emulsion applied to said emulsion inlet means on said vessel means, and the emulsion having the oil as the external phase and the fresh water as the internal phase;

c. a gas turbine receiving said treated oil phase as a combustible fuel which fuel is intermixed with compressed air, and subjected to combustion for operating said gas turbine with the resultant production of high-temperature combustion product gases released through an exhaust vent to the atmosphere;

d. controller means associated with said gas turbine for maintaining the combustion product gases in said exhaust vent at temperatures below 1,200° F.; and e. injector means for introducing said effluent water phase into said exhaust vent whereby the combustion product gases vaporize said effluent water stream and form a total gas solution without visible components at temperatures wherein sodium ion materials are relatively non-corrosive to ferrous metal conduits forming said exhaust vent.

3. The system of claim 2 wherein said controlled means maintain the combustion product gases in said exhaust vent at temperatures between 800° and 1,200° F.

4. The system of claim 2 wherein said injector means regulate introduction of said effluent water phase into said exhaust vent whereby the combustion product gas always has a mass of about 600 times the mass of said effluent water phase.

5. The system of claim 2 wherein said supply means regulate the flow of fresh water to said mixing means in amounts between 5 and 15 percent by volume of the untreated oil stream.

6. The system of claim 2 wherein said supply means regulate the flow of fresh water to said mixing means in an amount less than 10 percent by volume of the untreated oil stream.

7. The system of claim 2 wherein said controller means regulates the mixture of treated oil phase and air which are supplied to said gas turbine in an open cycle operation for maintaining the temperature of the product gases in said exhaust vent at temperatures below 1,200° F.

8. The system of claim 2 wherein said controller means regulates the operation of a heat exchanger between the treated oil and air mixture supplied at superatmospheric pressure for combustion in said gas turbine and the combustion product gases prior to passage into said exhaust vent.

9. The system of claim 4 wherein said effluent water phase is received into a storage vessel directly from said vessel means and then supplied to said injector means at a regulated rate whereby the combustion product gas always has a mass of about 600 times the mass of said effluent water phase, and the temperature of the combustion product gas in said exhaust vent is maintained between about 300° and about 1,200° F.

* * * * *

UNITED STATES PATENT OFFICE
CERTIFICATE OF CORRECTION

Patent No. 3,808,795                    Dated May 7, 1974

Inventor(s) Roy N. Lucas

It is certified that error appears in the above-identified patent and that said Letters Patent are hereby corrected as shown below:

In the drawing, add the numeral ---67--- to denote the "mass sensor" associated with the "injector 64".

Column 1, line 7, for "and", read ---an---;

Column 2, line 35, for "deslating", read ---desalting---;

Column 4, line 37, for "electical", read ---electrical---;

Column 5, line 65, after "energized", insert ---electrode---;

Column 6, line 20, after "inlet", insert ---conduit---;

Column 7, line 21, for "23", read ---15---;
            for "turbine stage 14", read ---combustion stage 13---;
line 34, for "24", read ---23---;
line 36, for "15", read ---13---;
line 39, omit "outlet";
line 47, omit "outlet";

Column 8, line 5, for "exchaust", read ---exhaust---;
line 7, for "due", read ---dew---;
line 15, for "inlet", read ---line---;
line 33, for "conduit", read ---vent---;

Column 9, line 23, for "temperature sensor", read ---detector---; and

Column 10, line 7, for "perimeters", read ---parameters---.

Signed and sealed this 10th day of December 1974.

(SEAL)
Attest:

McCOY M. GIBSON JR.
Attesting Officer

C. MARSHALL DANN
Commissioner of Patents